C. B. Bristol,
Nut Wrench.
N° 13,120.  Patented June 26, 1855.
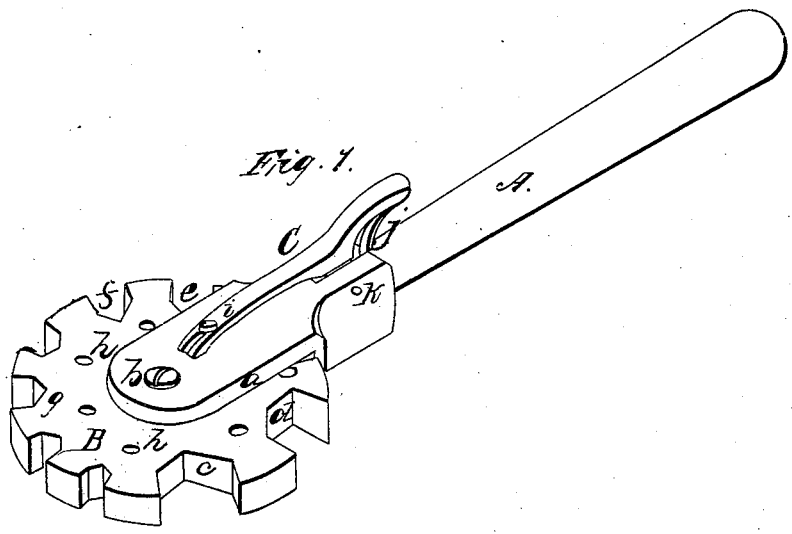
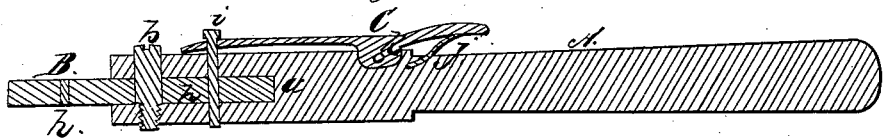

UNITED STATES PATENT OFFICE.

CHARLES B. BRISTOL, OF NAUGATUCK, CONNECTICUT.

WRENCH.

Specification of Letters Patent No. 13,120, dated June 26, 1855.

*To all whom it may concern:*

Be it known that I, CHARLES B. BRISTOL, of the town of Naugatuck, in the county of New Haven and State of Connecticut, have invented a new and useful Improvement in Wrenches; and I do hereby declare that the following is a full, clear, and exact description of the construction, character, and operation of the same, reference being had to the accompanying drawings, which make a part of this specification, in which—

Figure 1, is a perspective view of the wrench, complete. Fig. 2, is a longitudinal section of the same.

My improvement consists in constructing the wrench with a revolving set of spaces to receive the nut, making as great a variety of sizes as the size and strength of the disk will admit of, or as may be desired; and so that the appropriate size may be used in any desired position.

I make the handle, or stock, A, of the wrench of iron, or any other suitable material, and cut, or make, a slot in the end, as seen at $a$, to receive the disk, B, in which the disk is secured by a screw passing through the center, as seen at $b$.

I make the disk, B, of cast steel, or any other suitable material, of a size suited to the size of the stock, A, and in its periphery I cut, or make, spaces to receive or embrace the nut, of various sizes, so that one disk will serve for every size from the largest for which the disk is suitable to the smallest size, as seen at $c$, $d$, $e$, $f$, $g$, &c. (suited to hexagonal nuts, as shown in Fig. 1, or of any other polygonal shape.) And, inside of these spaces, I drill holes, as seen at $h$, $h$, &c., to receive a binding pin or bolt, $i$, to secure the disk in the desired position.

I work the binding pin, or bolt, $i$, by means of a lever, C, (working on a fulcrum pin, $k$,) which is faced to and held in the position shown in the drawings by a spring, $j$, so as to hold the disk firm in any desired position. These wrenches may be made of any desired size, and the disks of any desired thickness, and diameter, so as to have the requisite strength for the use intended; and the number of spaces may be varied at pleasure.

When I desire to change the position of the disk, I press down the outer end of the lever, C, which will draw out the pin, or bolt, $i$, and allow the disk to be revolved to the desired position, when by releasing the lever, the spring, $j$, will force the pin, $i$, into one of the holes, $h$, and secure the disk, B, ready for use.

The advantages of my improvement consist in having several sizes of one tool, in a situation to be changed at pleasure:—and in so arranging it, that the desired space may be in any desired position, as it may be changed from one position to another, if necessary, while using it; thus rendering it very convenient where no other kind of wrench could be used without difficulty. And in that the disk may be changed at pleasure, to suit the work:—and if one disk should be broken another could be substituted at much less expense than the cost of a new wrench; thus rendering economical as well as useful.

What I claim as my invention and desire to secure by Letters Patent is—

The combination of the disk with the stock and binding pin, when the whole is constructed, arranged, combined, and made to operate, substantially, as herein described.

CHARLES B. BRISTOL.

Witnesses:
M. S. MANCHESTER,
R. FITZGERALD.